June 14, 1932.    R. P. RASMUSSEN    1,863,207
MEANS FOR COOLING PRODUCTS
Filed Jan. 11, 1930    4 Sheets-Sheet 4
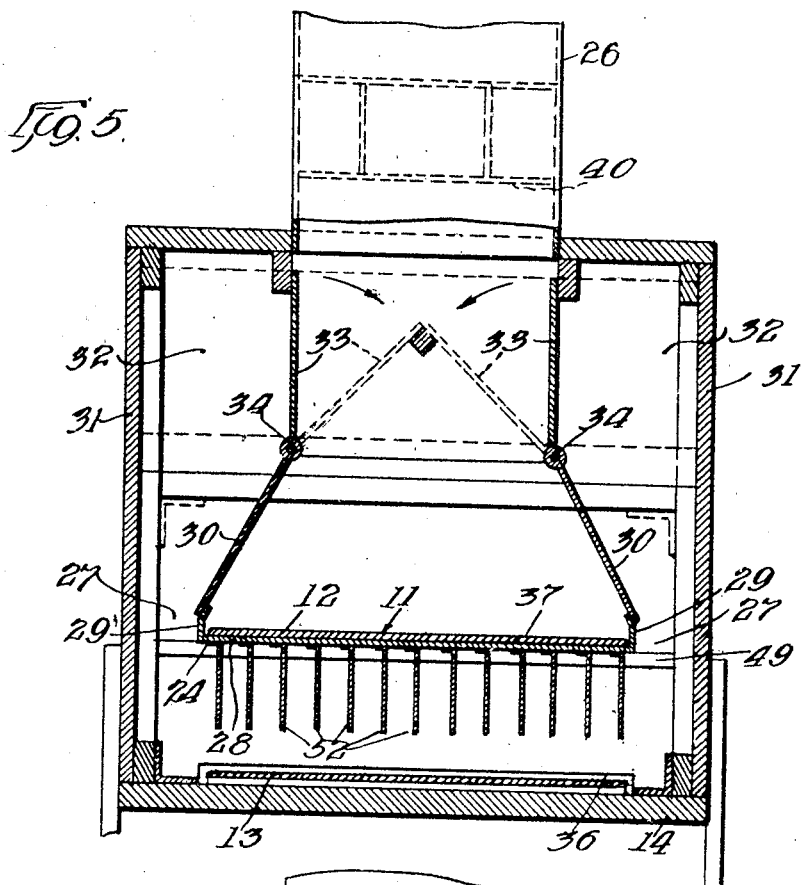
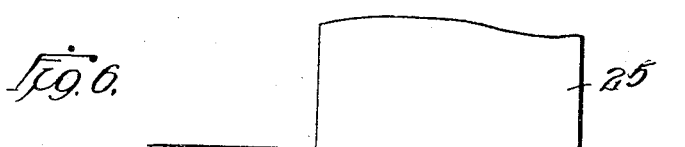
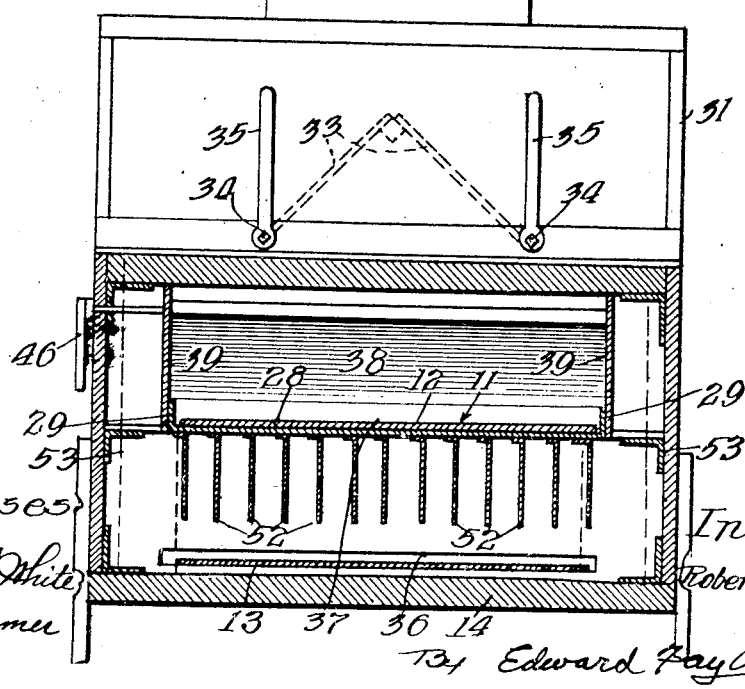
Witnesses
Harry R. L. White
Robt. Cremer
Inventor
Robert P. Rasmussen
By Edward Fay Wilson, Atty.

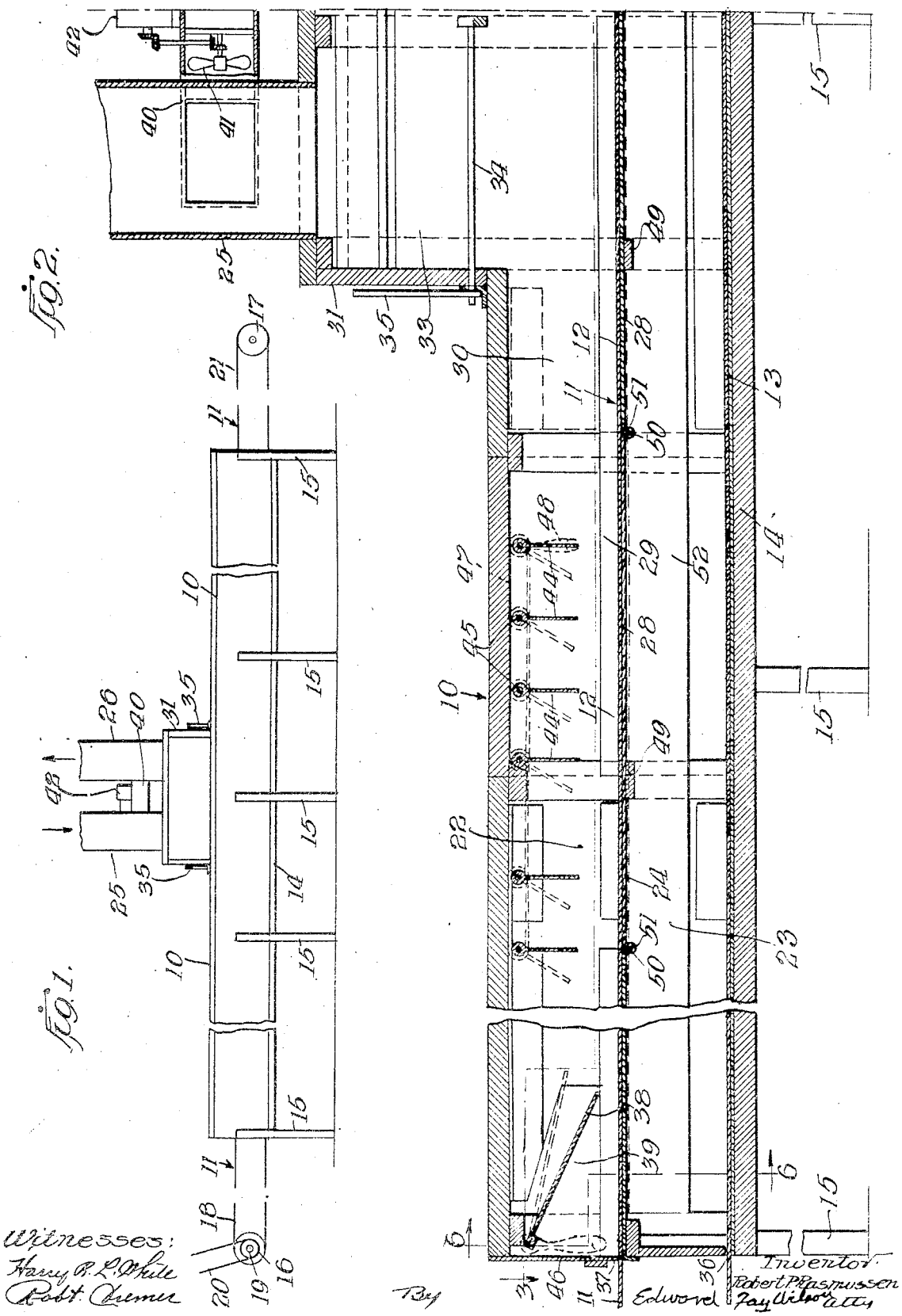

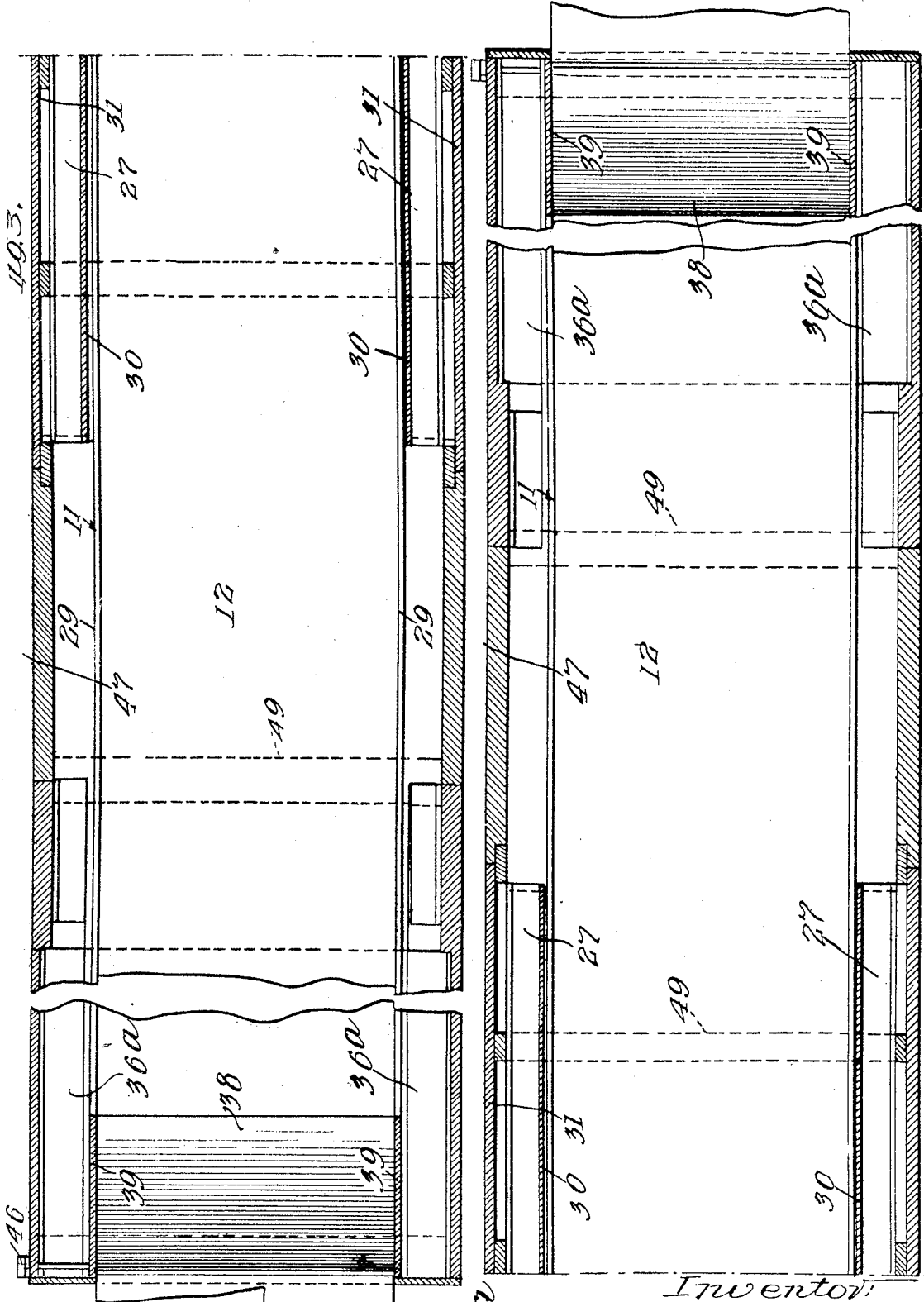

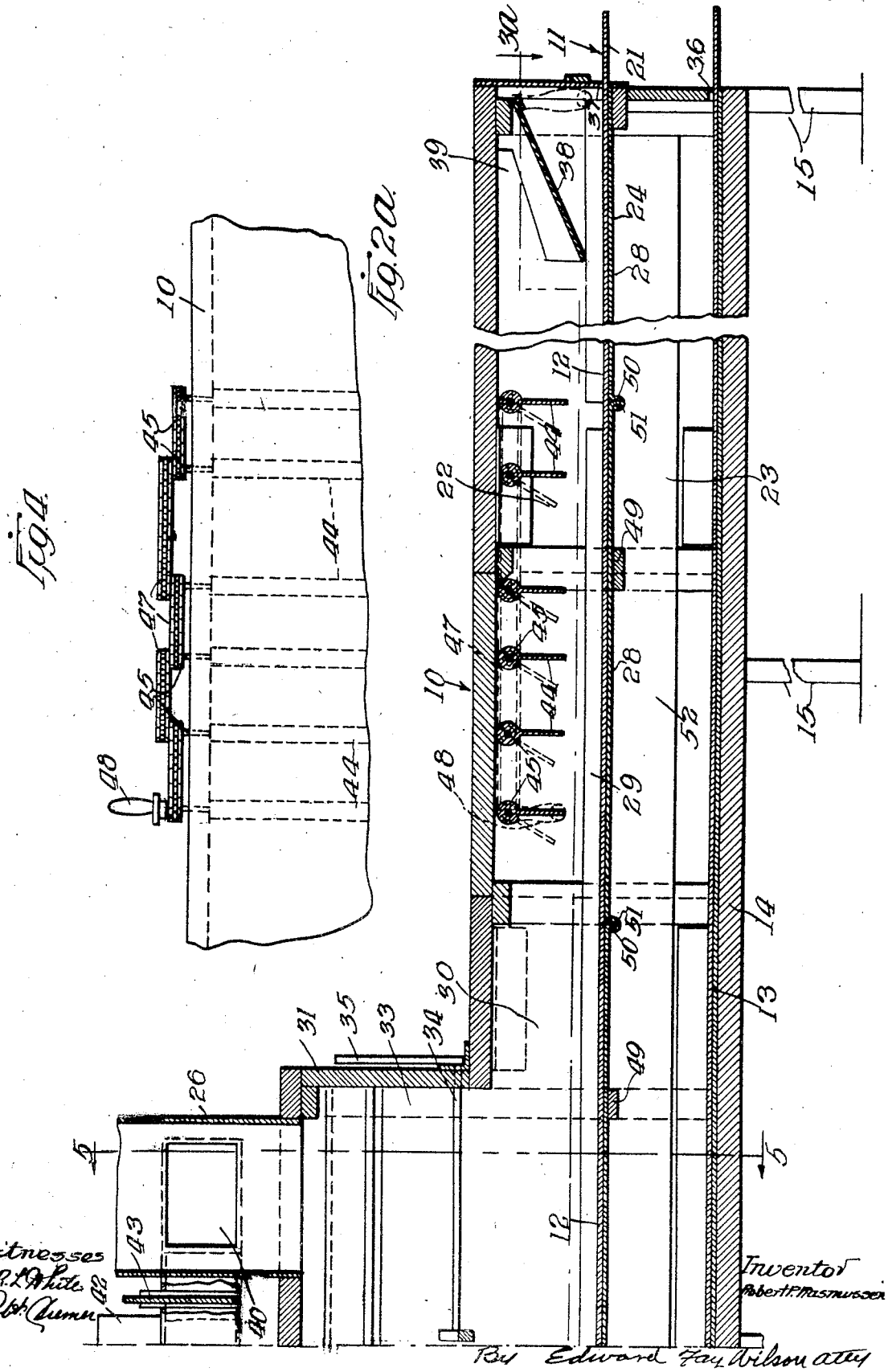

Patented June 14, 1932

1,863,207

UNITED STATES PATENT OFFICE

ROBERT P. RASMUSSEN, OF GLEN ELLYN, ILLINOIS

MEANS FOR COOLING PRODUCTS

Application filed January 11, 1930. Serial No. 420,207.

This invention relates to improvements in means and methods of cooling products such as candy and the like.

The object of the invention is to provide more efficient and more economical methods and means for cooling manufactured products such as candy, and particularly chocolate covered or coated candy pieces.

By means of these improvements I am enabled to readily obtain the results desired in the manufacturing of such products whether such results relate to quantity or quality of the output.

The invention relates particularly to the application of cooling air to the products as the products move through what is termed a tunnel.

A valuable feature of the invention resides in the method of applying the cooling air to the products and in one form consists in the application of the cooling air to both the forward and the rearward sides of the pieces of candy, thereby cooling both sides to the same extent and with the same rapidity. This results in better and more uniform products.

Another important feature resides in the efficient extraction of heat from the lower sides or bottoms of the pieces of candy, thus assisting in the rapid solidification of the candy pieces to a condition admitting of their rapid packing.

An important feature of the improved apparatus resides in the provision of dampers or valves in ducts adapted and arranged to facilitate the control of the flow of cooling air to flow at different times in different or opposite directions through the tunnel.

Another important feature resides in the novel means which I have provided for the application of the cooling air to the products which results in a balanced air pressure in the tunnel particularly as regards the ends of the tunnel. This balanced feature results in the prevention of the surrounding atmosphere which is usually or frequently heavily laden with moisture, entering either end of the tunnel.

Another advantageous feature relates to the provision of adjustable baffles in the tunnel by which the speed of the air as it flows in contact with the goods can be controlled or regulated to produce desired results. Another important result is obtained by means of these adjustable baffles, that is, that a turbulance is produced in the current of flowing air, causing all parts thereof to be at times brought into contact with the products being operated upon. This results in increased efficiency and economy.

Another feature which is of value relates to the return of a portion of the air into the supply, after it has passed through the apparatus. As no moisture is added to the air in the apparatus and the air is heated, its humidity is decreased and this relatively dry air added to the cooler in coming air, reduces its humidity and results in better products and more rapid and efficient cooling.

At times the cooling air is first directed beneath the products thus cooling the products and becoming heated and as no moisture is added, becoming dryer before it is directed into contact with the products. When coated chocolates are being cooled, this method of applying the cooling air results in giving the chocolates a desired higher luster.

At other times and for cooling other products, it is best to reverse the flow of the cooling air, causing it first to flow in contact with the products and afterward beneath the conveyor by which the products are carried through the tunnel. By means of my improved apparatus, I am enabled to control the flow of air as desired.

The apparatus includes as a feature of value, a metallic plate or floor which supports the conveyor as it passes through the tunnel. This metal plate, which is preferably made of aluminum, assists in extracting the heat from the products on the conveyor, and the cooling air flowing below this plate extracts the heat therefrom. In addition, in some instances, I have found it advantageous to provide an extended heat radiation surface beneath the metal plate to assist the flowing air in keeping the plate cool.

Many other advantageous features will become apparent from the following description taken in conjunction with the accompanying drawings, forming part of this specification, and in which:—

Fig. 1 is a side elevation of an apparatus embodying my improvement in article drying means and showing an apparatus which I have found best adapted for practicing my invention of methods of drying articles or products, particularly pieces of candy, and especially dipped chocolates;

Figs. 2 and 2a constitute a fragmentary, vertical, longitudinal section of the apparatus shown in Fig. 1;

Figs. 3 and 3a constitute a fragmentary, horizontal section on the line 3—3a of Figs. 2 and 2a;

Fig. 4 is a fragmentary plan view showing a means for operating a series of deflectors forming part of the apparatus;

Fig. 5 is a vertical, transverse section on the line 5—5 of Fig. 2a; and

Fig. 6 is a vertical, transverse section on the line 6—6 of Fig. 2.

The apparatus shown in the drawings comprises an elongated, horizontal conduit or tunnel 10 through which an endless conveyor belt 11 passes. The upper stretch 12 of the belt 11 is the operating part and is guided through the tunnel 10 at about the middle of the height of the tunnel and the lower stretch 13 of the belt is trained through the tunnel near its bottom 14. The tunnel is supported at suitable height on legs 15. The conveyor belt passes out of the tunnel at each end for convenience in loading and unloading it. At the ends, the belt 11 is trained around suitable pulleys 16 and 17, and at the forward or delivery end 18, means are provided for applying power to run the belt 11, such as the belt pulley 19 and drive belt 20.

The articles or material such as freshly coated, hot chocolates, are placed on the belt 11 at the right hand end 21, as shown in the drawings, and are carried by the belt through the tunnel where they are subjected to the action of a cooling medium such as air, and are taken off of the belt at the left hand end 18.

The tunnel 10 is divided into an upper compartment 22 and a lower compartment 23 by a longitudinally extending horizontal floor 24. Preferably for reasons to be explained, the floor consists of sheet metal of a character having high heat conductivity such as aluminum. This floor 24 is arranged just beneath the upper stretch 12 of the conveyor belt 11 and serves to support same.

In other words, the conveyor slides along in contact with the floor 24. The metal floor 24 serves to cool the bottoms of the articles on the conveyor as the conveyor carries them along.

This is an important feature in the cooling of candies, especially in making dipped chocolates.

The partition or floor 24 extends from side to side of the tunnel except at such places where it is desired to provide by-pass openings for directing the cooling medium from the top to the bottom of the tunnel, or vice versa.

An important feature of the invention relates to the method of applying the cooling medium to the articles to be cooled, but in any event, it is presumed that the conveyor belt 11 operates continuously in the desired direction, receiving the articles or materials at one end, carrying them by a continuous forward movement through the upper compartment of the tunnel, and delivering them at the other end.

For applying the cooling medium, in this instance atmospheric air, I provide an inlet 25 substantially at the middle of the length of the tunnel and adjacent to the inlet 25 I provide an outlet or exhaust 26.

The inlet 25 and exhaust 26 may be connected with any suitable means for supplying the cooling medium in such condition of temperature and humidity as may be best for the articles or materials being operated upon in the tunnel.

At times it is desirable to subject the material on the traveling conveyor 11 directly to the incoming air and at other times it is best to direct the incoming air beneath the belt first and bring it back over the belt.

I have provided simple damper or valve means for thus controlling the application of the air.

At the middle of the length of the tunnel, I provide by-pass passages 27, one at each side of the belt 11.

The plates 28 forming the floor 24 are bent up at their side edges as shown at 29, to provide the openings through the floor 24, and inclined partitions 30 join the upper edges of these up-turned edge portions to the lower end of the inlet 25 and outlet 26.

The inlet and outlet connections 25 and 26 lead into an upper extension 31 of the housing of the device and within this housing, longitudinally extending spaces or passages 32 are provided, one at each side, and which lead down to the by-passes 27.

Reversing means are provided for directing the incoming air either first above the traveling belt, or first below it. This means consists of pivotally mounted valves or plates 33 at the base of the intake and exhaust nozzles. As best shown in Fig. 5, these valves are mounted on shafts 34 at their lower edges, which are mounted in the walls of the extension housing 31 and are arranged and adapted to be placed in vertical position as shown in Fig. 5, in full lines or in inclined position, as shown in dotted lines.

When arranged vertically, they serve to connect the nozzle they control directly with the space above the traveling belt and when inclined they shut off this connection and connect the nozzle they control with the spaces or passages 32 at the sides which, as explained, are connected with the passage beneath the traveling belt and beneath the floor 24 by means of the by-passes 27.

Lever handles 35 are provided on the outer ends of the shafts 34 by which the valves or dampers 33 can be set.

When the inlet control valves are set as shown in full lines in Fig. 5, the incoming air flows down into the passage above the floor 24 and belt and divides, one-half flowing along over the belt toward one end of the tunnel, and the other half flowing to the opposite end. By-pass passages are provided at the ends of the tunnel through which the flowing air can pass from above the floor 24 to beneath same, or vice versa, as the case may be.

These by-passes at the ends of the tunnel are shown at 36a, Figures 3 and 3a and are formed similarly to the by-pass passages 27 at the middle of the tunnel by bending upwardly the edge portions of the floor 24.

If the valves or dampers 33 are set to cause the incoming air to flow in the tunnel above the floor 24, it passes down through the by-passes 36 at the two ends of the tunnel and flows toward the center of the tunnel from both ends. At this time the dampers or valves 33 controlling the outlet nozzle 26 will be set as shown in Fig. 5, in dotted lines and the used air flowing back to the center of the tunnel will flow up through the by-passes 27 and spaces 32 into the exhaust connection 26, thus completing a cycle of flow.

The ends of the tunnel are closed except narrow slots 37 above the floor 24 which are just high enough to permit the belt 11 to pass and the material or candy which it carries.

In order to prevent the flowing air being forced out of these narrow slots, longitudinally inclined deflector plates 38 are provided at the ends of the tunnel. These plates are shown, extend inwardly and downwardly from the end walls of the tunnel and also extend from side to side over the traveling belt 24. Side plates 39 close the space below the deflector plates 38 at the sides and serve to direct the flowing air to the by-passes 36a. As the slots 37 at the bottom of the ends of the tunnel are just high enough to let the belt 11 pass, it has not been found necessary to place deflectors at these points.

It will now be apparent that by properly setting the two sets of dampers or valves 33, the air can be directed in either direction desired.

The division of the cooling air causing half to flow from the middle of the tunnel toward each end and back again toward the middle before it is exhausted results in several important advantages. As each portion of the air travels a shorter circuit, less force or pressure is required, thus reducing the power and cost. The pressure at the ends of the tunnel is reduced to a pressure less than the old method and to a more nearly balanced relation to the outside pressure, thus reducing the loss at the ends. Furthermore the pressure which I maintain at each end prevents the entrance at these points of the surrounding atmosphere and as the surrounding atmosphere is usually relatively heavily laden with moisture, it is important to keep it out.

Preferably as has been explained, when cooling dipped chocolates or coated candies, the air is first directed beneath the floor 24 and then back above the floor. In its passage beneath the floor, the air increases in temperature and decreases in relative humidity so that it is in the best condition for contact with the candy pieces as it is directed, at the ends of the tunnel, from beneath the floor 24 to return above same. The air being dry, that is of low humidity and slightly warm, it gives the desired high luster to the candy. Any appreciable humidity in the cooling air is detrimental as it tends to discolor the chocolates, making them slightly gray or spotted.

The direction of the air from both ends of the tunnel toward the middle subjects all the candy pieces, as they pass along, first to the action of the air on their rear surfaces or sides, and then on their forward sides, thus operating substantially equally upon all sides of the pieces and resulting in a more uniform and high grade product.

It will now be clear that the cooling of the metal plate by the air flowing beneath same, cools the bottoms of the pieces of candy. The pieces are thus cooled evenly and thoroughly in a minimum of time and at a minimum of expense for air and power.

It is sometimes desirable on account of atmospheric conditions to return some of the air which has made a cycle back into the intake.

For this purpose a by-pass 40 is provided which connects the inlet connection 25 with the outlet connection 26 and a small fan 41 is arranged in this by-pass, driven by any suitable means such as an electric motor 42, to draw air from the exhaust connection 26 and force it into the inlet or supply connection 25.

An ordinary slide shut-off 43 may be provided to regulate the quantity of used air being returned to the intake or to close the by-pass to prevent any used air being returned.

When air flows through a passage such as that above the floor, it does not necessarily contact 100 per cent with the material to be acted upon. To cause a more effective contact, means are provided to direct the flowing air down upon the belt and to disturb the stream of air to prevent stratification. This means consists of plate deflectors 44 at the roof of the tunnel on transversely arranged shafts 45 and cranks 46 are secured on the outer ends of these shafts for setting the deflectors. The several cranks 46 can be connected by rods 47 so that a whole series of deflectors can be set at one movement of a handle 48.

When these deflectors are set to hang down, or at an inclination in the direction of the flowing air, they will force the air downwardly upon the belt and they also act as turbulators to disturb the flowing stream and cause all parts thereof to contact with the material being acted upon.

Another function of these deflectors is to regulate the speed of flow of the stream of air flowing through the tunnel. If the deflectors are set vertically, as shown in full lines Figs. 2 and 2a, all the air must pass between their lower edges and the belt 11 and consequently if the quantity of air flowing through the tunnel is maintained the same, the rate of flow is increased. It will be clear that by setting the deflectors at different angles, the rate of flow can be controlled as desired.

The plates 28 of which the metal floor or partition 24 is made up are supported upon cross bars 49, and joined together at their ends in a manner to avoid any ridges under the belt 11. These end connections as shown are made by bending down one end of each sheet at right angles to its length as shown at 50, and bending the adjacent end of the next sheet to form a co-operating hook 51, providing a groove to receive the flange 50. This form of connection is smooth on top and holds the sheets firmly locked together endwise. These sheets are also secured to and supported by suitable angle members 52 secured to the side walls of the tunnel.

To increase the radiation surface of the floor 24, metallic heat radiating strips or fins 53 are provided which hang down into the lower part 23 of the tunnel. These strips or fins are arranged longitudinally of the tunnel so that the flowing air is not hindered in its movement. They are secured at their upper edges to the lower surface of the floor plates and are effective to assist in cooling same.

As many modifications of the invention will readily suggest themselves to one skilled in the art, I do not limit or confine the invention to the specific details of construction, combinations of parts, or to the specific sequence of steps herein shown and described.

I claim:

1. In an apparatus of the kind described for cooling materials, an elongated closed conduit, a conveyor spaced substantially midway between the top and bottom of the conduit and movable longitudinally through same, air inlet means at substantially the middle of the length of the conduit through which cooling air can be forced into the conduit below the conveyor to flow beneath same towards the ends of the conduit, by-passes at the ends of the conduit for directing the air above the conveyor, an air exit adjacent to the inlet through which the air can escape, and means preventing the passage of air around the edges of the conveyor except through the by-passes.

2. In an apparatus in accordance with claim 1, reversible valve means in the air inlet and outlet by which the direction of flow of air through the apparatus can be reversed.

3. In an apparatus of the kind described, an elongated substantially closed conduit or tunnel, a belt conveyor arranged to move longitudinally through said conduit about midway between the bottom and the top thereof, means for supplying and exhausting cooling air at substantially the middle of the length of the conduit, by-pass passages at the middle of the length of the conduit for directing the air around the edges of the conveyor and by-pass passages at the ends of the conduit for directing the air around the edges of the conveyor whereby the air can enter the conduit at the middle on one side of the conveyor, flow towards both ends, pass to the opposite side at the ends and flow back towards the middle of the conveyor, and means preventing the passage of air around the edges of the conveyor except through the by-passes.

4. In an apparatus in accordance with claim 3, means in the air inlet and supply for reversing the direction of flow of air through the apparatus from the supply to the exhaust.

5. In an apparatus of the kind described, an elongated substantially closed conduit or tunnel, a belt conveyor arranged to move longitudinally through said conduit about midway between the bottom and the top thereof, means for supplying and exhausting cooling air at substantially the middle of the length of the conduit, by-pass passages at the middle of the length of the conduit for directing the air around the edges of the conveyor and by-pass passages at the ends of the conduit for directing the air around the edges of the conveyor and means preventing the passage of air around the edges of the conveyor except through the by-passes whereby the air can enter the conduit at the middle on the upper side of the conveyor, flow towards both ends, pass to the lower side at the ends and flow back towards the middle of the conveyor.

6. In an apparatus of the kind described, an elongated substantially closed conduit or tunnel, a belt conveyor arranged to move longitudinally through said conduit about midway between the bottom and the top thereof, means for supplying and exhausting cooling air at substantially the middle of the length of the conduit, by-pass passages at the middle of the length of the conduit for directing the air around the edges of the conveyor and by-pass passages at the ends of the conduit for directing the air around the edges of the conveyor, and means preventing the passage of air around the edges of the conveyor except through the by-passes whereby the air can enter the conduit at the middle on the lower side of the conveyor, flow towards both ends, pass to the upper side of the conveyor and flow back towards the middle of the conveyor.

In testimony whereof, I have hereunto set my hand this 14th day of December, 1929.

ROBERT P. RASMUSSEN.